(12) United States Patent
Swinderman

(10) Patent No.: US 6,401,911 B1
(45) Date of Patent: Jun. 11, 2002

(54) DIFFERENTIAL WEAR CONVEYOR BELT SCRAPER BLADE

(75) Inventor: R. Todd Swinderman, Kewanee, IL (US)

(73) Assignee: Martin Engineering Company, Neponset, IL (US)

( * ) Notice: Subject to any disclaimer, the term of this patent is extended or adjusted under 35 U.S.C. 154(b) by 0 days.

(21) Appl. No.: 09/479,261

(22) Filed: Jan. 5, 2000

Related U.S. Application Data

(60) Provisional application No. 60/116,010, filed on Jan. 15, 1999.

(51) Int. Cl.$^7$ .............................................. B65G 45/00
(52) U.S. Cl. ....................................................... 198/499
(58) Field of Search ................................. 198/497, 499

(56) References Cited

U.S. PATENT DOCUMENTS

| | | | |
|---|---|---|---|
| 3,841,470 A | * 10/1974 | Meguro | 198/230 |
| 3,994,385 A | 11/1976 | Reiter | |
| 3,994,388 A | 11/1976 | Reiter | |
| 4,036,351 A | * 7/1977 | Reiter | 198/499 |
| 4,053,045 A | 10/1977 | Reiter | |
| 4,533,035 A | 8/1985 | Reiter | |
| 4,533,036 A | 8/1985 | Gordon | |
| 4,535,883 A | 8/1985 | Kerr | |
| 4,541,523 A | * 9/1985 | Stockton | 198/499 |
| 4,598,823 A | 7/1986 | Swinderman | |
| 4,643,293 A | 2/1987 | Swinderman | |
| 4,887,329 A | * 12/1989 | Perneczky | 198/498 |
| 4,917,231 A | 4/1990 | Swinderman | |
| 4,925,434 A | 5/1990 | Swinderman et al. | |
| 4,953,689 A | 9/1990 | Peterson et al. | |
| 4,962,845 A | * 10/1990 | Gibbs | 198/499 |
| 5,016,746 A | * 5/1991 | Gibbs | 198/499 |
| 5,031,750 A | * 7/1991 | Barnes | 198/495 |
| 5,201,402 A | 4/1993 | Mott | |
| 5,222,588 A | 6/1993 | Gordon | |
| 5,301,797 A | 4/1994 | Hollyfield, Jr. et al. | |
| 5,797,477 A | 8/1998 | Veenhof | |
| 6,041,913 A | * 3/2000 | Dolan | 198/499 |
| 6,095,318 A | * 8/2000 | Brink | 198/499 |

OTHER PUBLICATIONS

Back–Flex Brochure of ASGCO Manufacturing, Inc., 1999, 1 page.

* cited by examiner

Primary Examiner—Christopher P. Ellis
Assistant Examiner—Joe Dillon, Jr.
(74) Attorney, Agent, or Firm—Lee, Mann, Smith, McWilliams, Sweeney & Ohlson

(57) ABSTRACT

A scraper blade adapted to be mounted on a cross shaft of a conveyor belt cleaner. The scraper blade includes a scraping member having a foot and a tip having a scraping edge. The scraping member is formed from an elastomeric material. The scraper blade also includes a base member that is adapted to be attached to the cross shaft of the conveyor belt cleaner. A resiliently flexible connector member extends between the base member and the foot of the scraping member. The connector member has a first end embedded within the foot of the scraping member and a second end embedded within the base member. A hinge member formed from an elastomeric material extends between the base member and the foot of the scraping member and embeds the portion of the connector member located therebetween. The flexible connector member enables the scraping member to resiliently pivot with respect to the base member about a pivot axis without any movement of the base member.

20 Claims, 2 Drawing Sheets

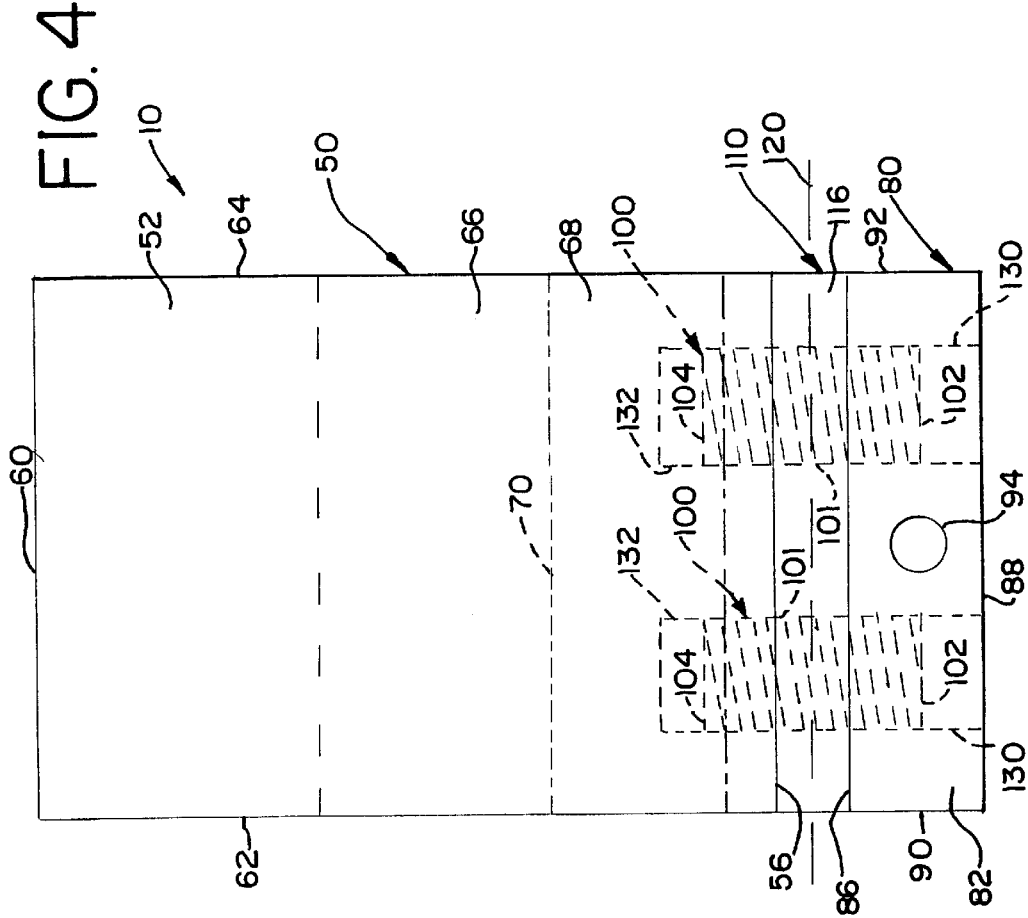
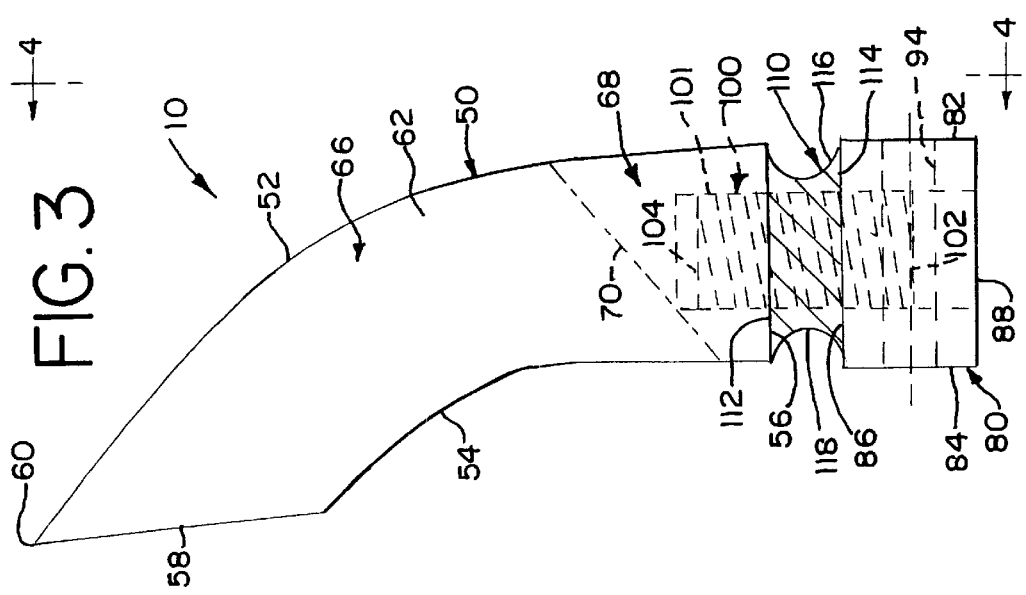

DIFFERENTIAL WEAR CONVEYOR BELT SCRAPER BLADE

RELATED APPLICATIONS

This application claims the benefit of U.S. Provisional Application No. 60/116,010, filed Jan. 15, 1999.

BACKGROUND OF THE INVENTION

The present invention is directed to a conveyor belt scraper blade for use in a primary conveyor belt cleaner, and in particular to a scraper blade having a base member and a scraping member spaced apart from and connected to the base member by a resiliently flexible connector member and by a hinge member such that the scraping member is resiliently pivotal with respect to the base member.

Conveyor belts that carry highly abrasive bulk materials, such as iron-ore, wear faster at the center of the conveyor belt than at the edges of the conveyor belt. This differential in conveyor belt wear is due to a greater loading of the abrasive bulk material at the center of the belt than at the edges of the belt, such that the center of the belt carries a larger portion of the weight of the conveyed bulk material than do the edges of the belt. The scraper blades of a conveyor belt cleaner that are located at the center of the conveyor belt also wear faster than the scraper blades that are located at the edges of the conveyor belt. Fine carry back material often remains adhered to the conveyor belt after the conveyed material has been discharged from the belt. The fine carry back material is more heavily concentrated at the center of the belt than at the edges of the belt. This causes a differential in wear between scraper blades of a conveyor belt cleaner that are located at the center of the belt and scraper blades that are located at the edges of the conveyor belt. The combination of these two conditions, increased loading and a greater amount of carry back material at the center of the belt, causes accelerated wear to the center of the conveyor belt and to the scraper blades of a conventional conveyor belt cleaner that are located at the center of the belt. The differential in the wear of the conveyor belt and in the wear of the scraper blades of a conveyor belt cleaner results in a generally elongate elliptical-shaped cavity being formed between the conveyor belt and the scraper blades at the center of the belt that quickly grows in size and that allows unacceptable quantities of carry back material to pass beyond the conveyor belt cleaner.

Conventional primary conveyor belt cleaner scraper blades are mounted on a cross shaft that is rotated about the longitudinal axis of the shaft to tension the scraper blades against the belt. Any compensation for differential wear rates between the center of the belt and the edges of the belt is provided for by the elasticity of the material from which the scraper blades are formed. Typically, conventional scraper blades can only bend or flex a few degrees to accommodate differential wear in the conveyor belt or unevenness in the surface of the pulley about which the conveyor belt rotates. For belts carrying normally abrasive bulk materials, such as coal, this few degrees of compensation for differential wear is adequate. However, when highly abrasive materials, such as iron-ore, are conveyed this limited amount of compensation is inadequate.

Elastomeric materials all take some compression set so that when an elastomeric scraper blade is flexed or deflected under load, over time it does not fully rebound or return to its original position. In addition, the elastomeric materials that are best suited for wear resistance tend not to be the elastomeric materials that have optimum compression set properties. This results in unacceptable design trade-offs. Materials with optimum properties for maintaining a constant amount of resilient rebound after deflection include engineering materials such as spring steel and composite materials. These materials can function as springs when deformed within their elastic limits. However, such materials are not suitable materials from which to make primary scraper blades due to the high cost of the material and the possibility of the material causing damage to the conveyor belt. The scraper blade of the present invention makes use of the desirable properties of elastomers and of engineering materials such as spring steel to overcome the above problems.

The scraper blade of the present invention can easily accommodate up to fifteen degrees of rotation or pivotal movement of the scraping member of the scraper blade with respect to the base member of the scraper blade, without creating an excessive cleaning pressure between the scraper blade and the conveyor belt, which would otherwise result by pivoting the scraping tip of a conventional elastomeric scraper blade the same fifteen degrees, or even just ten degrees, with respect to its base member. A fifteen degree compensation for differential wear of the conveyor belt and of the scraper blades on a conveyor belt cleaner is sufficient to efficiently clean a conveyor belt carrying highly abrasive materials.

SUMMARY OF THE INVENTION

A scraper blade adapted to be mounted on a cross shaft of a conveyor belt cleaner wherein the cross shaft is selectively movable, either by rotation about a rotational axis or by linear movement. The scraper blade includes a scraping member having a lower foot portion and a tip having a scraping edge. The foot and the tip are formed from an elastomeric material. The scraper blade also includes a base member formed from an elastomeric material that is adapted to be attached to the cross shaft of the conveyor belt cleaner. The base member is spaced apart from, but is located in relatively close proximity to, the foot of the scraping member. One or more resiliently flexible connector members, such as metal springs, extend between the base member and the foot of the scraping member. Each connector member has a first end attached to and embedded within the foot of the scraping member and a second end attached to and embedded within the base member. A hinge member extends between a top surface of the base member and a bottom surface of the foot of the scraping member and embeds the portions of the connector members that are located between the base member and the scraping member. The hinge member may be formed from an elastomeric material that is substantially softer than the elastomeric material that forms the scraping member and the base member or from the same elastomeric material that forms the scraping member. The hinge member includes a generally concave front surface and a generally concave rear surface that form a hinge plane. The resiliently flexible connector members and the hinge member enable the scraping member to resiliently pivot with respect to the base member about a pivot axis that is located between the base member and the scraping member without any movement of the base member.

BRIEF DESCRIPTION OF THE DRAWING FIGURES

FIG. 1 is a perspective view of a plurality of the scraper blades of the present invention installed in a conveyor belt cleaner and shown in use in connection with a conveyor mechanism.

FIGS. 2A–D illustrate the pivotal movement of the scraping member of the scraper blade with respect to the base member of the scraper blade to accommodate differential wear.

FIG. 3 is a side elevational view of the scraper blade.

FIG. 4 is a front elevational view of the scraper blade taken along lines 4—4 of FIG. 3.

DETAILED DESCRIPTION OF THE PREFERRED EMBODIMENTS

Figure 1:
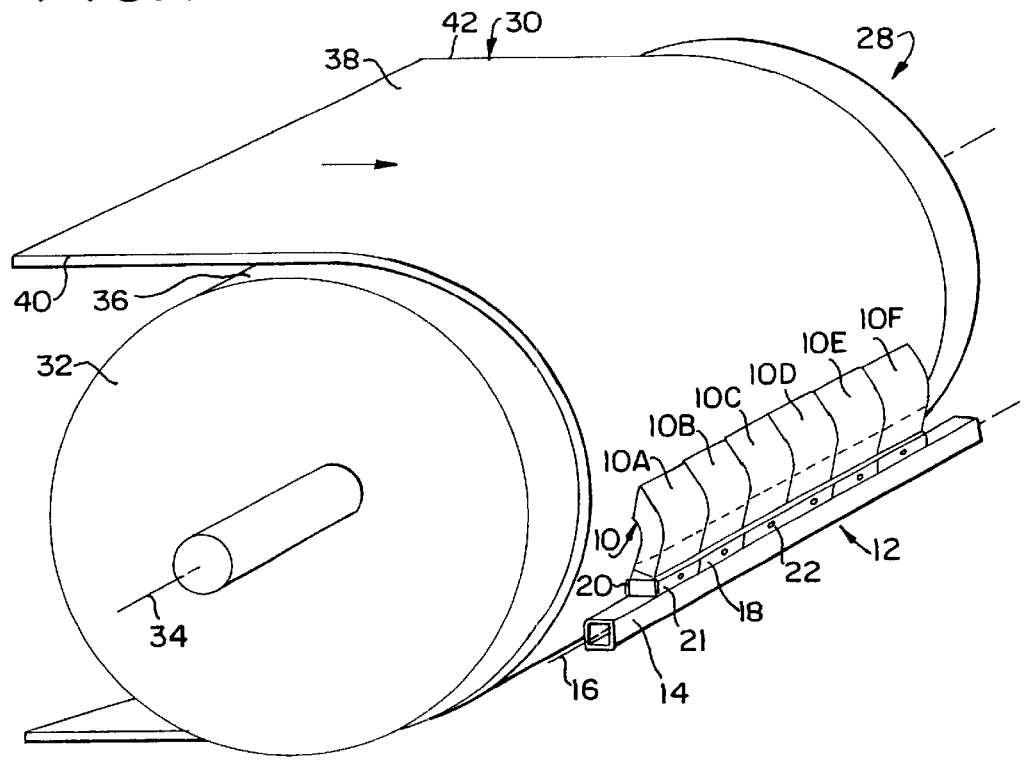

The conveyor belt cleaner scraper blade 10 of the present invention is adapted to be used in connection with a conveyor belt cleaner assembly 12 as shown in FIG. 1. The conveyor belt cleaner 12 includes an elongate cross shaft 14 that is adapted to be rotatably mounted to a support member at each end and that is adapted to be selectively rotated about its longitudinal axis 16 such as by a standard conveyor belt cleaner tensioner device (not shown) which may be of the type illustrated in U.S. Pat. No. 4,925,434 or U.S. patent application Ser. No. 09/428,956, filed Nov. 4, 1999, both owned by applicant herein. A mounting member 18 is attached to the cross shaft 14. The mounting member 18, as shown in FIG. 1, comprises a pair of spaced apart elongate and generally planar bar members 20 and 21 that extend longitudinally along the cross shaft 14. Each bar member 20 and 21 includes a plurality of spaced apart apertures 22. Each aperture 22 in the first bar member 20 is aligned with an aperture 22 in the second bar member 21 to receive a pin or other fastener extending therethrough. Various other types of mounting members may be used as are well known in the art. The conveyor belt cleaner assembly 12 may alternatively include a cross shaft that is linearly movable rather than rotationally movable.

The conveyor belt cleaner assembly 12 includes a plurality of scraper blades 10, which are respectively designated with the reference numbers 10A to 10F in FIG. 1. The scraper blades 10A–F are removably attached to the mounting member 18 and the cross shaft 14. The scraper blades 10A–F are located in horizontal alignment with one another and adjacent to one another longitudinally along the cross shaft 14. The scraper blades 10A–F are conjointly movable with the cross shaft 14 about the axis 16.

As shown in FIG. 1, the conveyor belt cleaner 12 is adapted for use with a conveyor mechanism 28. The conveyor mechanism 28 includes a conveyor belt 30 that is rotatable about a head pulley 32 at the discharge end of the conveyor mechanism 28. The head pulley 32 is rotatable about a central axis 34. The head pulley 32 includes a generally cylindrical surface 36 that engages the conveyor belt 30. The surface 36 of the head pulley 32 may be crowned such that the surface 36 has a greater diameter at its center than at either edge. The conveyor belt 30 includes an outer surface 38. The outer surface 38 extends between a first edge 40 and a second edge 42 of the conveyor belt 30.

As best shown in FIGS. 3 and 4, the scraper blade 10 includes a scraping member 50 having a front surface 52 and a spaced apart rear surface 54. The scraping member 50 also includes a bottom surface 56 that extends between the bottom edge of the front surface 52 and the bottom edge of the rear surface 54, and a scraping surface 58 that extends between the top edge of the front surface 52 and the top edge of the rear surface 54. The front surface 52 includes a scraping edge 60 at the intersection of the front surface 52 and the scraping surface 58. The scraping edge 60 and the scraping surface 58 are adapted to engage the outer surface 38 of the conveyor belt 30. The scraping member 50 also includes a first side surface 62 and a spaced apart second side surface 64.

The scraping member 50 includes a wear tip 66 and a foot 68. The wear tip 66 extends from the scraping surface 58 to the foot 68. The foot 68 extends from the bottom surface 56 to the wear tip 66. The wear tip 66 is integrally formed with and connected to the foot 68. The wear tip 66 is adapted to wear, through scraping engagement with the conveyor belt 30, to a position where the scraping edge 60 is located at a wear line 70, at which time the scraper blade 10 should be replaced. The foot 68 is not intended to engage the conveyor belt 30.

The front surface 52 of the scraping member 50 is preferably configured to maintain an approximately constant scraping angle between the surface 38 of the conveyor belt 30 and the front surface 52 at the scraping edge 60 as the wear tip 66 wears and is pivoted into continuing engagement with the conveyor belt 30. The rear surface 54 of the scraper member 50 is preferably configured and is spaced apart from the front surface 52 such that as the wear tip 66 wears, the scraping pressure with which the scraping surface 58 is forced into engagement with the outer surface 38 of the conveyor belt 30 remains substantially constant. The front surface 52 and the rear surface 54 may be configured as disclosed in U.S. Pat. No. 4,917,231 and U.S. patent application Ser. No. 09/428,956, filed Nov. 4, 1999, of Martin Engineering Company, which are incorporated herein by reference. However, the front surface 52 and the rear surface 54 of the scraping member 50 may be configured and located with respect to one another in various different manners as desired.

The scraping member 50 also includes a base member 80. The base member 80 is generally rectangular and includes a front surface 82 and a generally parallel and spaced apart rear surface 84. The base member 80 also includes a generally planar top surface 86 and a spaced apart and generally parallel planar bottom surface 88. The base member 80 extends between a first side surface 90 and a second side surface 92. As best shown in FIG. 3, the bottom surface 56 of the scraping member 50 is spaced apart from the top surface 86 of the base member 80. A generally cylindrical bore 94 extends through the base member 80 from the front surface 82 to the rear surface 84. The bore 94 is shown generally centrally located within the front and rear surfaces 82 and 84, but two or more spaced apart bores can be used to prevent rotation of the scraper blade 10 about the central axis of a single bore 94. The bore 94 is positioned to align with the pair of opposing apertures 22 in the bar members 20 and 21 of the mounting member 18. A fastener (not shown) such as a bolt or pin is adapted to extend through the opposing apertures 22 in the mounting member 18 and through the bore 94 to rigidly and removably connect the base member 80 to the cross shaft 14 for conjoint movement with the cross shaft 14. As an alternative to including a bore 94, or in addition thereto, the bottom surface 88 of the base member 80 may be formed as an inverted generally T-shaped member, such as disclosed in U.S. Pat. No. 4,953,689 of the applicant herein, which is adapted to slidably fit within a complimentarily shaped track on the support shaft.

The scraping member 50 and the base member 80 are both preferably made from an elastomeric material, and preferably from a urethane elastomeric material such as a polyester or polyether based urethane. A preferred castable polyester urethane material is sold by Air Products and Chemicals, Inc. in Allentown, Pa. under the product designation "A-9". The A-9 urethane material has a typical hardness of approximately 90 Shore A. However, the hardness of the elastomeric material from which the scraping member 50 and base member 80 are made can range from approximately 80 Shore A to approximately 70 Shore D. The A-9 urethane material has a tensile modulus of approximately eleven hundred pounds per square inch at one hundred percent elongation. However, the range of moduli of urethane materials that can be used for forming the scraping member 50 and the base member 80 can range from approximately five hundred pounds per square inch to approximately seven thousand eight hundred pounds per square inch at one hundred percent elongation. If desired, the base member 80 may be made from various other materials.

The scraper blade 10 includes one or more resiliently flexible connector members 100 which are shown in phantom in FIGS. 3 and 4. Each connector member 100 is preferably a resilient spring member, such as a helical coil spring as illustrated in FIGS. 3 and 4, a leaf spring, or a flexible bar or plate. The connector member 100 is preferably formed from a material having a modulus of elasticity of approximately seventy-eight thousand pounds per square inch or greater as measured within the elastic limit of the material, such as a spring steel material or a fiberglass and epoxy composite material. The scraper blade 10, as shown in FIG. 4, preferably includes a plurality of connector members 100. Each connector member 100 extends between a bottom end 102 and a top end 104. A preferred connector member 100, as shown in FIGS. 3 and 4, is a nonelastomeric helical coil spring member 101, such as a die spring manufactured by Danly Spring under Product No. 9-2010-26. The coil spring 101 illustrated in FIGS. 3 and 4 is approximately 2 ½ inches long and has a ¼ inch outer diameter and a ⅝ inch internal diameter. The spring member 101 has a load rating of approximately 50.1 pounds per 0.1 inch of compression but other spring characteristics may be utilized depending upon the particular applications of the belt being cleaned and the material carried by the belt. As shown in FIGS. 3 and 4, the top end 104 of the spring member 101 is embedded within and is connected to the foot 68 of the scraping member 50, and the bottom end 102 is embedded within and is connected to the base member 80. The central longitudinal axes of the spring members 101 are disposed generally perpendicular to the planar surfaces 56, 86 and 88 of the scraping member 50 and base member 80 when the spring members 101 are in a relaxed condition as shown in FIG. 3. The spring member 101 is made from spring steel, but could be made from other materials such as a fiberglass and epoxy composite material. A connector member 100 formed from spring steel may have a modulus of elasticity of approximately twenty-eight million pounds per square inch or greater as measured within the elastic limit of the steel material.

The scraper blade 10 may include a hinge member 110 that extends between the bottom surface 56 of the scraping member 50 and the top surface 86 of the base member 80. The hinge member 110 includes a top surface 112 that is attached to the bottom surface 56 of the scraping member 50 and a bottom surface 114 that is attached to the top surface 86 of the base member 80. The hinge member 110 preferably includes a generally circular and concave front surface 116 that forms a generally elongate and linear groove between the bottom edge of the front surface 52 of the scraping member 50 and the top edge of the front surface 82 of the base member 80. The hinge member 110 also preferably includes a generally circular and concave rear surface 118 that creates a generally elongate and linear groove between the bottom edge of the rear surface 54 of the scraping member 50 and the top edge of the rear surface 84 of the base member 80. The concave surfaces 116 and 118 form a hinge plane and aid in allowing the scraping member 50 to pivot with respect to the base member 80. The hinge member 110 is preferably made from an elastomeric material such as urethane, and may be made from the same type of material that is used to form the scraping member 50 and base member 80. Alternatively, the elastomeric material from which the hinge member 110 is formed may additionally include plasticizers to make the hinge member 110 very soft and easily compressible, such that the hinge member 110 has a hardness of approximately thirty to forty Shore A.

The hinge member 110 deflects and compresses easily while filling the space between the scraping member 50 and the base member 80 and encloses the portions of the connector members 100 that extend between the scraping member 50 and base member 80 to prevent corrosion of the connector members 100 and to prevent any build-up of the conveyed material in the space between the scraping member 50 and the base member 80 which could inhibit the pivotal movement of the scraping member 50 with respect to the base member 80. The hinge member 110 also dampens any tendency of the connector members 100 to vibrate. The hinge member 110 and the connector members 100 create a barrier to sound transmission that is sometimes a concern when solid elastomeric scraper blades are used in connection with conveyor belts having mechanical splices.

Figure 2A:
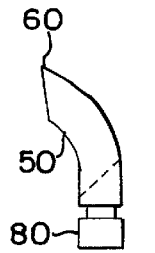
Figure 2B:
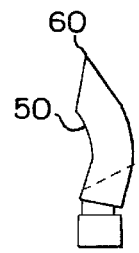

The connector members 100 and the hinge member 110 of the scraper blade 10 enable the scraping member 50 and its scraping edge 60 to pivot about a pivot axis 120 located in the hinge member 110 between the bottom surface 56 of the scraping member 50 and the top surface 86 of the base member 80. The scraping member 50 may initially be pivoted approximately fifteen degrees about the pivot axis from a relaxed position as shown in FIG. 2A to a position as shown in FIG. 2D with respect to and without any movement of the base member 80. As the portion of the conveyor belt 30 that the scraping member 50 engages wears, and as the wear tip 66 of the scraping member 50 wears, the connector members 100 and hinge member 110 pivot the scraping member 50 with respect to the base member 80 about the pivot axis into continuing biased scraping engagement with the conveyor belt 30 until the scraping member 50 returns to its original relaxed position as shown in FIG. 2A.

Figure 2C:
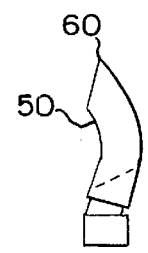
Figure 2D:
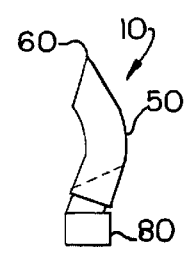

As an example, the scraping member 50 will pivot from the position as shown in FIG. 2D, wherein the scraping member 50 is pivoted approximately fifteen degrees from its relaxed position as shown in FIG. 2A, to a position as shown in FIG. 2C wherein the scraping member 50 is pivoted approximately 12.5° from the relaxed position as shown in FIG. 2A. As the conveyor belt 30 and wear tip 66 wear further, the scraping member 50 will pivot from the position as shown in FIG. 2C to the position shown in FIG. 2B wherein the scraping member 50 is pivoted approximately ten degrees from the relaxed position as shown in FIG. 2A, and eventually is pivoted to the relaxed position of FIG. 2A. The pivotal movement of the scraping member 50 caused by the connector members 100 and the hinge member 110 all takes place without any movement or rotation of the base member 80 or the cross shaft 14.

The scraper blade 10 is formed by initially casting a urethane material, which may be relatively soft if desired, in a first mold to form the hinge member 110, with the connector members 100 centrally embedded in the hinge member 110 such that the ends 102 and 104 of the connector members 100 project outwardly from the hinge member 110. The hinge member 110 is then cured at an approximate temperature of 200° F. for approximately sixteen hours. Thereafter the top surface 112 and bottom surface 114 of the hinge member 110 are treated with a bonding agent as is well known in the art. The hinge member 110 and connector members 100 are then placed within a second mold. The scraping member 50 and the base member 80 are then cast using a relatively hard urethane material such that the scraping member 50 is spaced apart from the base member 80, such that the hinge member 110 integrally connects the scraping member 50 to the base member 80, and such that the top ends 104 of the connector members 100 are embedded in the foot 68 of the scraping member 50 and the bottom ends 102 of the connector members 100 are embedded in the base member 80.

In operation, a plurality of scraper blades 10A–F are removably mounted to the cross shaft 14. The cross shaft 14 is then rotated about the axis 16 such that at least one of the scraping edges 60 of the scraper blades 10A–F engage the conveyor belt 30. The cross shaft 14 is then further rotated approximately an additional fifteen degrees by the tensioner of the conveyor belt cleaner such that at least one of the scraping members 50 of the scraper blades 10A–F has pivoted or rotated with respect to its base member 80 an angle of approximately fifteen degrees from its relaxed position. The tensioner applies a torsional biasing force to the scraper blades 10 from a time when the scraper blades 10 are in a new condition until the scraper blades 10 are fully worn, and at the same time provides a sufficient torsional biasing force to pivot the scraping member 50 about the pivot axis 120 with respect to the base member 80.

It is expected that all of the scraper blades 10A–F will wear but not at the same rate. Each scraper blade 10 is designed such that its scraping member 50 will not be fully worn just by pivoting through the fifteen degrees of pivotal movement that is provided by the connector members 100. The tensioner maintains a torsional force on the cross shaft and provides approximately 37.5° of rotation of the cross shaft and of the scraper blades 10A–F as the scraper blades 10A–F wear. In addition to the 37.5° of rotation of the scraper blades 10A–F that is provided by rotation of the cross shaft, the connector members 100 provide an additional fifteen degrees of pivotal movement of the scraping member 50. The scraping member 50 is therefore designed to be fully worn after 37.5° of rotation of the cross shaft, plus fifteen degrees of pivotal movement of the scraping member 50 about the pivot axis 120 with respect to the base member 80.

As an example, as the center portion of the conveyor belt 30 wears more quickly than the edges of the belt 30, the scraping members 50 of the scraper blades 10C and 10D which engage the center portion of the belt 30 will be pivoted by the connector members 100 and the hinge members 110 of the scraper blades 10C and 10D into continuing scraping engagement with the conveyor belt 30 without any rotation or pivotal movement of the base members 80 of the scraper blades 10C and 10D or of the cross shaft 14 about the axis 16, and while the scraping members 50 of the scraper blades 10A and 10F remain in their original positions. In addition, if the scraping member 50 of a particular scraper blade 10A–F, such as scraper blade 10C, wears at a faster rate than one or more of the other scraper blades, such as scraper blade 10A, the scraping member 50 of scraper blade 10C will be pivoted into continuing scraping engagement with the conveyor belt 30 by the connector members 100 and hinge member 110 of scraper blade 10C without any corresponding rotation or pivotal movement of the base member 80 of the scraper blade 10C or of the cross shaft 14 about the axis 16, while the scraping member 50 of the scraper blade 10A may remain it is original position. Consequently the scraping member 50 of each scraper blade 10A–F will pivotally adjust with respect to its associated base member 80 to compensate for wear of the portion of the conveyor belt 30 that each scraper blade is respectively scraping, and will compensate for the wear of the wear tip 66 of the scraping member 50, independently of the other scraper blades that form a part of the conveyor belt cleaner 12 and independently of any rotation or pivotal movement of the cross shaft 14.

The scraper blade 10 utilizes the desirable properties of elastomeric materials and the desirable properties of resilient engineering materials such as spring steel or composite materials. The scraper blade 10 enables the scraping member 50 and its wear tip 66 to be formed from a suitable wear material without concern as to the elasticity of the scraping member 50 that would otherwise be required to compensate for differential wear of the conveyor belt 30 or of adjacent scraper blades. The base member 80 can be made of any suitable material for attachment to the connector members 100 and for connection to the cross shaft 14 and can be made from a different material than the scraping member 50.

The connector members 100 not only allow for pivotal adjustment of the scraping member 50 to compensate for differential wear, they also compensate for uneven loading created by impacts on the scraper blade, and for misalignment caused by manufacturing tolerances and even bending of the cross shaft 14 under load. The scraper blades 10 also accommodate crowned pulleys 32 and out of round pulleys 32 well beyond the limits of conventional primary scraper blades.

The scraping pressure between the scraping member 50 and the conveyor belt 30 that is generated by the connector members 100 is of a magnitude that is required for efficient cleaning. This pressure is preferably in the range of approximately two to four pounds per square inch. This optimum scraping pressure can be approximately maintained during the wear life of the scraper blades 10 by retensioning the cross shaft in accordance with the maintenance instructions for the type of tensioner being used.

In an alternative embodiment, the scraping member 50 and the base member 80 are cast separately from one another, or the base member may be made from a material other than an elastomer. The spring members 101 are used as mechanical fasteners to join the scraping member 50 to the base member 80 with or without the use of the hinge member 110. As shown in FIG. 4, one or more threaded bores 130 are cast in and through the base member 80. The threaded bores 130 extend generally perpendicularly through the top surface 86 and bottom surface 88 of the base member 80. A pair of threaded bores 132 are also cast in the foot 68 of the scraping member 50. The threaded bores 132 extend inwardly into the foot 68 from the bottom surface 56. The hinge member 110 may also include a pair of bores respectively aligned with the bores 130 and 132. The threads in the bores 130 and 132 of the base member 80 and the foot 68 of the scraping member 50 are configured to matingly engage the helical coils of the spring members 101.

Each spring member 101 is rotated about its central longitudinal axis to thereby screw the top end 104 of the spring member 101 from the bottom surface 88 of the base member 80 through the bore 130 in the base member 80 and into the bore 132 of the foot 68 of the scraping member 50. The spring members 101 thereby resiliently and pivotally connect the scraping member 50 to the base member 80. The spring members 101 may be rotationally driven by a mechanical device such as an impact wrench. The spring members 101 may be rotated in an opposite direction to withdraw the spring members 101 from the foot 68 of the scraping member 50. In this manner, a scraping member 50 having a worn-out wear tip 66 may be removed from the base member 80 and replaced by a new scraping member 50, while reusing the base member 80 and the spring members 101.

Various features of the invention have been particularly shown and described, however, it must be understood that these particular arrangements merely illustrate, and that the invention is to be given its fullest interpretation within the terms of the appended claims.

What is claimed is:

1. A scraper blade adapted to be mounted on a cross shaft of a conveyor belt cleaner, said scraper blade including:
    a scraping member including a foot and a tip having a scraping edge, said tip being formed from a first elastomeric material having a first modulus of elasticity;
    a base member spaced from said scraping member, said base member adapted to be attached to the cross shaft of the conveyor belt cleaner; and
    a resiliently flexible connector member having an enclosed length and extending between said base member and said scraping member, said connector member having a first end attached to said scraping member and a second end attached to said base member, said connector member being formed from a material having a second modulus of elasticity that is greater than said first modulus of elasticity of said tip;
    whereby said flexible connector member enables said scraping member to resiliently pivot with respect to said base member.

2. The scraper blade of claim 1 wherein said first end of said connector member is embedded within said foot of said scraping member.

3. The scraper blade of claim 1 wherein said second end of said connector member is embedded within said base member.

4. The scraper blade of claim 1 including a plurality of resiliently flexible connector members extending between said base member and said scraping member.

5. The scraper blade of claim 1 wherein said material that forms said connector member comprises metal.

6. The scraper blade of claim 1 wherein said connector member comprises a spring member.

7. The scraper blade of claim 1 wherein said base member is formed from an elastomeric material.

8. The scraper blade of claim 1 wherein said resiliently flexible connector member is formed from a nonelastomeric material.

9. The scraper blade of claim 1 wherein said foot of said scraping member includes a first threaded bore, and said base member includes a second threaded bore, said first end of said connector member being located in and threadably attached to said first bore and said second end of said connector member being located within and threadably attached to said second bore.

10. The scraper blade of claim 1 wherein said scraping member includes a front surface, a rear surface and a bottom surface, said connector member extending outwardly from said bottom surface toward said base member.

11. The scraper blade of claim 10 wherein said base member includes a top surface in opposing relationship to said bottom surface of said scraping member, said connector member extending outwardly from said top surface of said base member toward said bottom surface of said scraping member.

12. The scraper blade of claim 1 including a hinge member extending between said base member and said foot of said scraping member and enclosing said connector member.

13. The scraper blade of claim 12 wherein said hinge member includes a generally concave front surface and a generally concave rear surface.

14. The scraper blade of claim 12 wherein said hinge member is formed from a second elastomeric material, said first elastomeric material being harder than said second elastomeric material.

15. The scraper blade of claim 12 wherein a portion of said connector member located between said base member and said scraping member is embedded within said hinge member.

16. A scraper blade adapted to be mounted on a cross shaft of a conveyor belt cleaner, said scraper blade including:
    a scraping member including a foot and a tip;
    a base member adapted to be attached to the cross shaft of a conveyor belt cleaner;
    a resiliently flexible connector member, said connector member having a first end located within said scraping member and a second end located within said base member, said connector member being enclosed within said scraper blade from said first end of said connector member to said second end of said connector member;
    whereby said connector member enables said scraping member to resiliently pivot with respect to said base member.

17. The scraper blade of claim 16 wherein said scraping member is integrally attached to said base member.

18. The scraper blade of claim 16 including a hinge member extending between said scraping member and said base member.

19. A scraper blade adapted to be mounted on a cross shaft of a conveyor belt cleaner, said scraper blade including:
    a scraping member including a foot and a tip having a scraping edge, said tip being formed from an elastomeric material;
    a base member spaced from said scraping member, said base member adapted to be attached to the cross shaft of the conveyor belt cleaner;
    a resiliently flexible connector member extending between said base member and said scraping member, said connector member having a first end attached to and located within said scraping member and a second end attached to said base member; and
    a hinge member located between said scraping member and said base member, said connector member extending into said hinge member;
    whereby said flexible connector member and said hinge member enable said scraping member to resiliently pivot with respect to said base member.

20. The scraper blade of claim 19 wherein said hinge member is formed from an elastomeric material.

* * * * *